United States Patent Office 3,044,302
Patented July 17, 1962

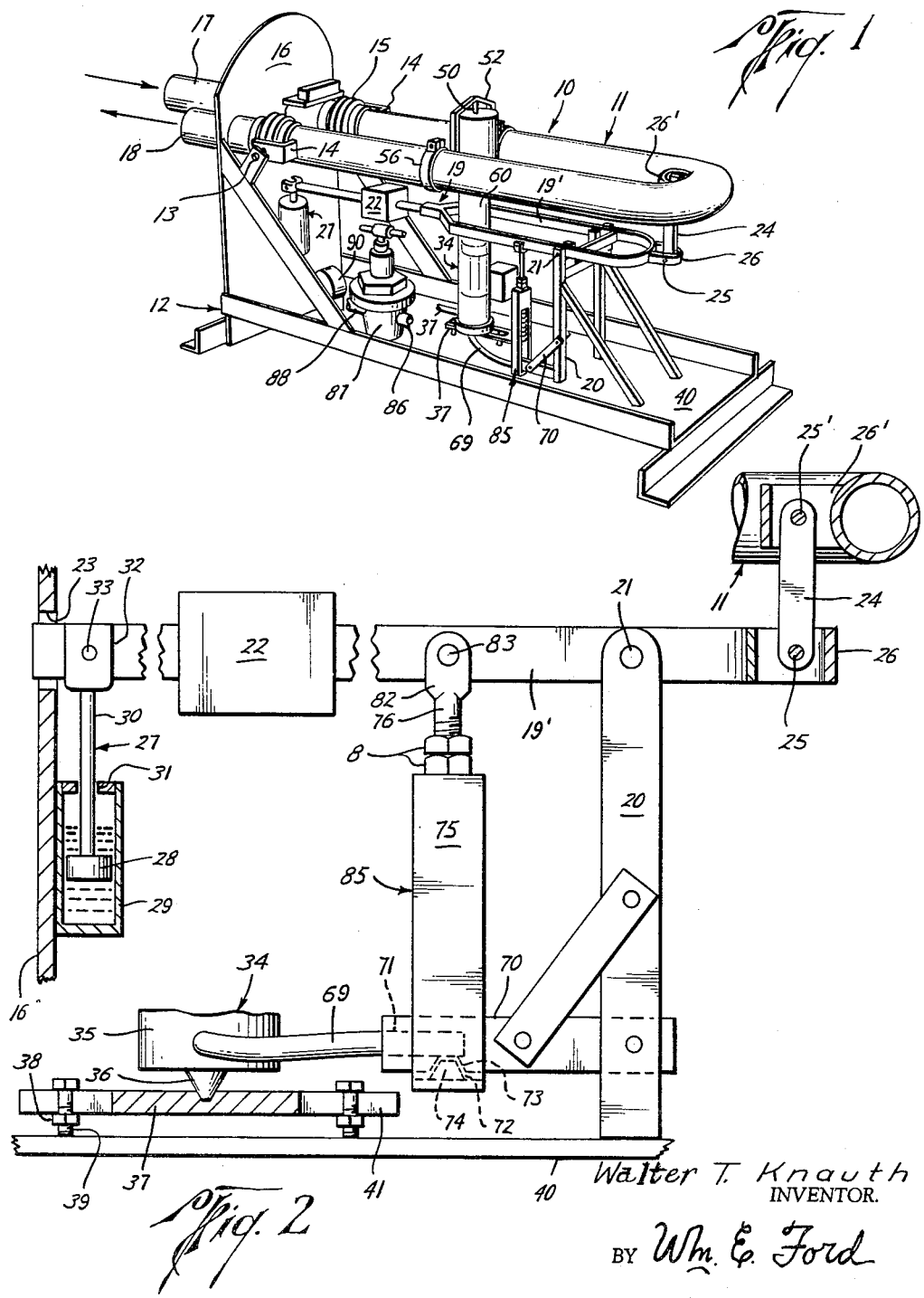

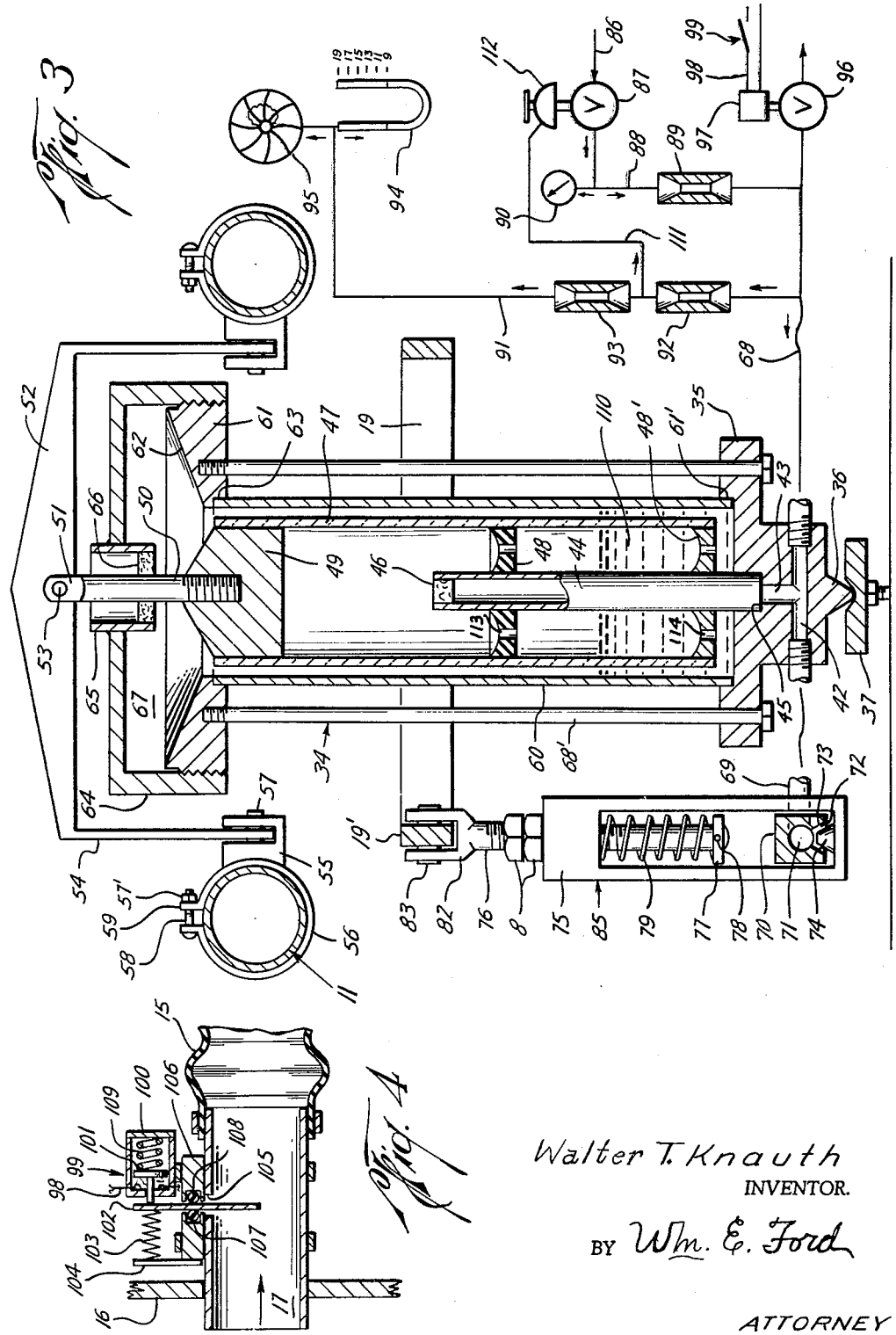

3,044,302
MEANS FOR MEASURING AND RECORDING
LIQUID DENSITY
Walter T. Knauth, 1334 W. Gray, Houston, Tex.
Filed Mar. 24, 1958, Ser. No. 723,444
12 Claims. (Cl. 73—434)

This invention relates to a device for automatically and continuously indicating and recording the density of fluids such as well drilling fluids and the like.

The invention has special application as apparatus for measuring by indicating and recording means the fluid which is employed in the rotary method of drilling wells, as oil and gas wells wherein a fluid termed the drilling mud is circulated down through the drill pipe and up through the annular space between the drill pipe and the well bore. The mud serves to carry away the cuttings from the bit and also it balances the force of the hydrostatic pressure from below to prevent blowouts, and additionally it serves as a medium which transports the cuttings from the drilling bit out of the well bore to be settled out in a mud pit at the top of the well. Additionally the drilling mud forms a filter cake on the surface of the well bore which resists the caving in thereof, and which militates against the mud flowing out into crevices and voids communicating with the well bore and thereby being lost from circulation.

It is necessary that the drilling mud must be of sufficient weight to balance against the force of any upwardly acting hydrostatic pressure such as the pressure of gas, water, or oil which may be liberated in drilling, and at the same time the drilling mud should not become so heavy that it may not be returned to the top of the well and recirculated. As conditions encountered vary in the course of drilling, the weight of the drilling mud has to be varied constantly to meet changes in conditions.

For instance if a gas sand is penetrated in drilling the drilling mud will absorb the gas and become considerably lighter. Such a condition must be detected immediately and remedied by the adding of weighting material to the mud or otherwise the mud might not balance out the force of the hydrostatic pressures which may react upwardly thereagainst in the course of drilling, with the consequence that a condition is set up whereby a blowout may be possible. The control of the weight of the drilling mud can be so important in cases to the extent that a variation in mud weight of a very small fraction of a pound per gallon may constitute the difference between satisfactory and unsatisfactory performance in drilling. Consequently it is essential that continual accurate measurement of the mud density must be maintained at all times during the drilling operation.

This invention sets out to accomplish refined and accurate measurement of mud density with measurements reflected continuously by indicating and recording means through the medium of apparatus which will not be plugged or clogged, as in the case where the mud to be measured has to pass through small conduits, restricted passages, or stand in containers where part of the mud may jell out of the fluid prior to passage on to be measured.

It is consequently a primary object of this invention to provide fluid density measuring apparatus of the class described which measures the fluid while it is in full course through a conduit, carrier, or barrel into which and out of which it flows in the course of being measured.

It is also an object of this invention to provide a fluid density measuring device of this class which measures the buoyant force required to balance out any increased fluid density above a reference minimum and indicate and record such buoyant force in terms of density measurements, the apparatus thereby being operative over a selected range of density measurements rather than being operated from an initial absolute minimum.

It is a further object to provide a fluid density measuring device of this class in which the buoyant force required to balance out any increased fluid density above the reference minimum is arrived at by supporting the force normally maintaining such balance by an additive force proportionate to the density increase above the reference minimum density.

It is an additional object of this invention to provide a fluid density measuring device of this class which is set into balancing action automatically responsive to the entrance of the fluid to be measured into the flow tube or barrel of the device, such action being automatically discontinued upon the interruption of fluid flow through the device.

It is still another object of this invention to provide a fluid density measuring device of this class which is safe in operation, accurate in measurement, which requires a minimum number of working parts to accomplish its purposes, is easily connected into the source of mud delivery thereto, and which is inexpensively constructed and easily serviced and maintained.

Other and further objects will be apparent when the specification herein is considered in connection with the drawings in which:

FIG. 1 is an isometric view of the invention;

FIG. 2 is a longitudinal elevation, partially fragmentary and partially in section, showing the relationship of essential parts of the invention;

FIG. 3 is an elevation partially diagrammatic and part in section, taken transversely of the device and showing most of the working parts of the invention and their relationship; and FIG. 4 is a sectional elevation showing the means responsive to entering fluid flow into the flow tube or barrel, to start the balancing apparatus of the invention.

Referring in detail to the drawings in which like reference numerals are assigned to corresponding elements in the various views, a device 10 for measuring and recording fluid density, is shown in FIG. 1 as comprising a U-shaped flow pipe, conduit, or barrel 11 which is pivotally mounted on a frame 12 by means of pivot pins 13 journalled in the frame and connected to brackets 14 welded to opposite sides of the barrel. A flexible hose section 15 connects each end of the barrel to a conduit rigidly connected to the frame plate 16, the fluid supplied to pass through the barrel for measurement entering through the inlet conduit 17 and departing through the outlet conduit 18.

A beam 19 is pivotally mounted on frame uprights 20 by means of opposed pivot pins 21 journalled in the uprights and welded to the beam. Such beam 19 has a balancing weight 22 slidably mounted thereon, and the end of the beam adjacent the frame plate 16 extends through a slot 23 provided in the plate, the upper and lower ends of the slot acting as stops for the beam.

A pivotal connection is made between the barrel 11 and the beam 19 by means of a linkage 24 connected downwardly by a pivot pin 25 extending outwardly on either side of the linkage 24 and journalled in a U-shaped clip 26 welded to the beam 19, and connected upwardly by a similar pivot pin 25' extending outwardly on either side of the linkage 24 and journalled in a U-shaped clip 26' welded to the central part of the loop of the barrel 11. The linkage 24 is of such length between the axes of the pivot pins 25, 25' that the beam 19 will extend horizontally when the barrel 11 likewise extends horizontally.

A mechanical dash pot assembly 27 is provided at the end of the beam 19 adjacent the plate 16, such assembly comprising a piston 28 operable in a fluid containing cylinder 29, the rod 30 of the piston extending through an opening 31 provided in the upper end of the cylinder 29. A yoke 32 is provided on the upper end of the piston rod 30, and a pivot pin 33 extends through the beam 19 and outwardly on each side thereof to be journalled in the sides of the yoke to pivotally connect the piston rod 30 to the beam. With this arrangement the friction caused by the downward movement of the piston 28 in the cylinder fluid dampens downward movement of the beam 19, while the friction caused by the upward movement of the piston in such fluid dampens upward movement of the beam.

A buoyancy lift assembly 34 is provided to balance the downwardly acting force representing an increase in the density of fluid flowing through the barrel 11, as will be hereinafter described. Such assembly includes a base flange 35 having a conical point 36 as the lower element thereof. The point seats in a conical recess provided in a base support plate 37 which rests upon nuts 38 mounted on threaded posts or adjustment screws 39 extending upwardly from the bottom or base plate 40 of the frame 12.

In order to adjust the position of the buoyancy lift assembly 34 in direction longitudinally of the device 10, it is necessary to provide slots 41 in either end of the plate 37. The adjustment screws 39 extend through these slots so that the heads thereof may bear on the top surface of the plate 37 adjacent to the slots, and when the heads are turned to tighten the adjustment screws the plate is bound in position at any longitudinally selected position to which the plate 37 may be moved with relation to the longitudinal axis of the frame base 40. Also adjustment can be made vertically by regulating the depth to which the adjustment screws 39 are threaded into the base plate 40.

A horizontally extending passage 42 is provided in the base flange 35 with which there communicates a vertically extending passage 43 from the top of the flange 35. Such passage 43 is counterbored upwardly to receive therein a gas inlet tube 44, the bottom of which shoulders at 45 at the base of the counterbore. The top of such inlet tube 44 has a closure 46 therein which should be sufficiently porous to permit the easy passage of a gas such as compressed air therethrough but which will exclude a heavier substance such as mercury from passing through the closure into the inlet tube 44, for a purpose to be hereinbelow explained. The inlet tube 44 may be of any suitable material such as glass which will repel the amalgamation of the mercury. A tube 47, also preferably of glass, surrounds the tube 44 and is spaced therefrom by guide members 48 and 48' which are slidable upon the tube 44 and press-fitted into the tube 47 to space it concentrically with relation to the tube 44, such guide members or spacers 48, 48' having passages 113, 114, respectively, therethrough, so that gas, as compressed air, may pass through the passage 113 to bear against mercury 110 in the tube 47, and so that the mercury 110 may pass through the passage 114 as the compressed air urges downwardly upon it.

The upper end of the tube 47 has a closure 49 therein which is drilled and tapped centrally to receive a connection bolt 50 threadably thereinto. This connection bolt 50 has a fork 51 at the top thereof through which connection is made to a yoke 52 by means of a connecting pin 53. The downwardly extending arms which form the opposed sides 54 of the yoke are connected to ears 55 which extend inwardly from clamps 56 as shown in FIG. 3 connection pins 57 being used for this purpose. Each clamp 56 is connected about the barrel 11 by tightening a nut 57' upon a bolt 58 which extends through opposed flanges 59 at the ends of the clamp. By virtue of this connection if the tube 47 should slide upwardly on the tube 44 as will be hereinafter described, the yoke 52 is lifted thereby and consequently lifts the barrel 11 to which it is connected. Conversely, if the tube 47 slides downwardly upon the inlet tube 44 the barrel 11 will be carried downwardly in a like manner.

The tube is surrounded by a tube 60 which seats in a recess 61' in the flange 35. A plate 61 has a bore and counterbore 63 through the lower end thereof and a countersink 62 through the upper end thereof as shown in FIG. 3. The counterbore 63 receives the upper end of the tube 60 thereinto to shoulder in the plate 61. Through bolts 68' extend upwardly through holes in the flange 35 and are threadable into the plate 61 to firmly assemble the plate, tubes, and flange together. A cap 64 is threadable upon the plate 61 and such cap has a sleeve 65 which passes through the top thereof concentrically about the bolt 50. Such sleeve is connected to cap 64 such as by welding and has a porous closure, as a felt disc 66, in the lower end thereof surrounding the bolt 50. The closure 66 is sufficiently porous to let air from the exterior pass therethrough into the cap. On the other hand the closure 66 is of such limited porosity that a heavy liquid such as mercury, having a very low viscosity, cannot pass therethrough. Thus obviously should the device be inverted as in handling and/or in shipping, the cap 64, including the closure 66, and the plate 61, will form a reservoir to retain the mercury, as it cannot pass outwardly through the closure 66 because of the limited porosity of the closure, as aforesaid.

The buoyancy lift assembly 34 is located with its axis in a vertical plane extending through the longitudinal axis of the U-shaped barrel 11 and of the frame 12. For this reason the beam 19 is bifurcated or has its forward part in the shape of a yoke as best seen in FIG. 1. A conduit 68 from a source of compressed gas, as air, to be hereinafter described, is connected into the base flange 35 to communicate with the passage 42 therethrough, the purpose and function of such a source of compressed gas is to be described hereinbelow. A conduit 69 extends from the passage 42 opposite the conduit 68 and connects into a stationary valve body 70 shown in elevation in FIG. 2 and shown in transverse sectional elevation in FIG. 3. The conduit 69 connects into such valve body 70 to communicate with the flow passage 71 therein and such flow passage 71 extends to communicate with a discharge port 72 through a valve seat 73 whereby fluid carried by said conduit 69 may be discharged outwardly. The valve seat 73 is tapered to receive the surface of a frusto-conical valve element 74 thereinto which when sealed will cut off fluid flow from the passage 71 through the discharge port 72.

Such valve element 74 is carried on a yoke 75 which has a drilled and threaded hole through the top thereof so that a connection bolt 76 may be threaded therethrough and a stop flange 77 pinned on the lower end of such bolt 76 by means of a through pin 78 which serves to compress a spring 79 which extends around the bolt 76 and bears upwardly against the yoke 75 and downwardly against the flange 77. The bolt 76 is locked with relation to the yoke 75 by virtue of two lock nuts 8 which are threaded thereon prior to the assembly of the spring, bolt, and yoke. The head of the bolt 76 comprises a forked member 82 and for purposes of this disclosure the bolt is seen connected to one arm 19' of the yoked part of the beam 19, a pin 83 being provided and extending through the fork 82 and arm 19' for this purpose. Optionally such connection could be made to a member extending across the forked portion of the beam 19 in which case the valve assembly 85 comprising the parts described immediately hereinabove could be positioned with its axis in a vertical plane passing through the longitudinal axis of the barrel 11 and frame 12 as hereinabove described.

A source of compressed air is connected by means of a conduit 96 to a conventional pressure regulator or reducer valve 87, compressed air being generally recommended as the medium supplied by such source. In the pressure regulator the air is reduced to a reference minimum pressure of say 5 p.s.i. and passes therefrom through a conduit 88 having a choke 89 therein to dampen the effect of forces tending otherwise to produce rapid changes in the pressure of the flowing air. The conduit 88 connects into the conduit 68 hereinabove described and the air is delivered thereby into the passage 42 to pass upwardly into the conduit 44 and to pass from the passage 42 into the conduit 69 and through the flow passage 71 and out through the discharge port 72 when the valve element 74 is unseated. A conventional pressure gauge 90 is connected into the conduit 88 as shown in FIG. 3.

From the conduit 68 a conduit 91 having two chokes 92 and 93 therein, extends to the drilling floor of the drilling rig and has a manometer 94 connected thereinto at a position where it may be easily observed by the operator who may control the density of the drilling fluid or circulating mud in correspondence with the manometer indications, the manometer being calibrated in density graduations as in pounds per gallon. The conduit 91 also extends to a pressure recorder 95 which is calibrated to convert pressures into terms of density and which plots on a chart density indications against time.

In order that the device may not be operative while the circulation fluid is not being supplied to the barrel 11, it is necessary to insure that there should be no build up of pressure in the buoyancy tube during this period, and this assurance can be had, even in cases where the valve 85 may be stuck in closed position, by maintaining the outer end of the conduit 68 opened when the circulating fluid is not flowing. This is accomplished by providing a normally open valve 96 in the outer end of such conduit.

A solenoid 97 is provided to close the valve 96 when the circuit 98 to the solenoid is energized and this is accomplished by providing a switch which is normally open but which is closed by the beginning of fluid flow into the barrel 11. The switch assembly 99 includes a housing 100 having a plunger 101 operative therein, a plate or vane 102 bearing against the outer end of the plunger 101 and a spring 103 in turn bearing against the vane 102 on the opposite side thereof from the plunger 101, such spring being based against a backing plate 104, as shown in FIG. 4. The inlet member 17, which conveys circulating fluid into the barrel 11, has a slit 105 therein through which the lower end of the vane 102 extends, and downwardly therefrom for a substantial distance into the inlet 17. A mounting bracket 106 has the backing plate 104 connected thereto, and also has the switch housing 100 mounted thereon. Such mounting bracket 106 provides slits and recess space 107 therein, the vane 102 passing through the slits and the recess space and a rubber seal 108 being provided of O cross-section to fit in the rectangular shaped recess space and to press laterally against the vane 102 and to act as a pivot therefor while at the same time sealing against outward leakage of the circulating fluid.

Thus when the entering fluid strikes the vane 102 the outer end pivots rearwardly against the spring 103 and about the O-ring seal 108 as a fulcrum, so that a spring 109 within the switch housing 100 can urge the plunger 101 against the contact points of the switch to close the circuit 98 so that the solenoid 97 is actuated to close the valve 96.

To calibrate the device, there first may be employed a circulating fluid of a reference minimum density slightly below the minimum density of any fluid which might be circulated in a well bore being drilled by the rotary method of drilling wells, as oil and gas wells. With this fluid flowing in the barrel level, the positions along the longitudinal axis of the beam 19 may be selected at which the buoyancy lift 34 and weight 22 may be positioned. At the same time the pressure to which the compressed air is reduced by the pressure reducer 87 and the size of the flow passages therefrom into the buoyancy tube 47 and into and out of the valve assembly 85 will regulate the time required to build up a buoyant force to counteract any increase in the density of the circulating fluid flowing through the barrel 11. This force, required at any time, is measured in terms of the inside cross-sectional area of the buoyancy tube 47 multiplied by the density of the liquid, as mercury 110, in the buoyancy tube 47 and in the mercury tube 60, this product further multiplied by the difference in height between the mercury level in the mercury tube and the mercury level in the buoyancy tube. Such difference is substantially linearly proportionate to the increase in circulating fluid density above the reference minimum circulating fluid density.

For purposes of illustration let 9 pounds per gallon be taken as the density of a circulating fluid slightly below the density of the lightest circulating fluid which might be encountered in drilling the wells in question. Then with compressed air being supplied to the valve assembly 85 from the conduit 69, and with the valve 96 closed, the position of the valve body 75 on the stem 76 is adjusted to let enough air escape through the valve passageway or escape port 72 until the beam 19 and the barrel 11 are both in substantially parallel, horizontally extending position in which case the air pressure acting in the buoyancy tube 47 will be at substantially atmospheric pressure. Also, balance may be further determined by the positioning of the dead weight 22 along the beam 19, and by the positioning of the buoyancy lift assembly along the longitudinal axis of the barrel 11, as will be hereinbelow described.

The positions of the weight 22 and buoyancy lift assembly 34 are in the meantime so positioned along the longitudinal axis of the beam 19 and the barrel 11, respectively, that there is substantial equilibrium between the forces acting about a fulcrum or pivot axis coextensive with the axis of the pins 21. Then, under such conditions, no lifting force is required of the buoyancy tube 47 and the air pressure in such tube may be at atmospheric with the escape valve 74 being widely opened, in which case the mercury in the buoyancy tube 47 and in the mercury tube 60 will stand at substantially the same level, as shown in FIG. 3. Correspondingly, the liquid in the arms of the manometer 94 will stand at the same level and this level may be graduated at the reference minimum circulating fluid density as established at 9 pounds per gallon.

Also, correspondingly, the gauge 95 may be graduated to record a minimum or a reference density as 9 pounds per gallon at its innermost point on the chart thereon, which is peripherally graduated in time measurements, as hours, the outermost distance from the center of the chart being graduated as that selected maximum reference density of a circulating fluid slightly heavier than the heaviest which may have to be circulated in drilling.

Thereafter the downwardly acting force corresponding to a mud of measured density increased to say 11 pounds per gallon and set flowing through the barrel, will lift the valve body 75 to move the valve element 74 upwardly to restrict the escape of compressed air through the valve port 72, so that air pressure is built up in the buoyancy tube 47. This increased air pressure forces downwardly on the mercury 110 in the buoyancy tube 47 and forces it upwardly in the mercury tube 60, so that the increase may be measured directly in terms of air pressure in the buoyancy tube as determined by the difference in height of mercury in the mercury tube 60 above the height of mercury in the buoyancy tube 47. The buoyancy of the buoyancy tube lift assembly is thus increased by the buoyant force thus created to act upwardly in opposition to the increased force representing the increase in weight of the flowing contents of the barrel 11 acting downwardly, so that a position of equilibrium is restored between the forces acting about the fulcrum 21, 21.

Thus any increase in mud density over the reference minimum of 9 pounds per gallon will be automatically countered by a directly proportionate increase in air pressure in the buoyancy tube. Since changes in air pressure are indicated by the manometer 94 and recorded by the pressure recorder 95, provisions can be made, responsive to the respective indications and recordings, to adjust therefor proportionately thereto.

This can be done by moving the buoyancy lift assembly 34 closer to the barrel pivot 25' to obtain an increase in the air pressure and mud density relation or by moving the buoyancy lift assembly 34 further away from the barrel pivot 25' to obtain a decrease in the air pressure and mud density relation. The change of position of the buoyancy lift assembly 34 can be effected by unclamping the clamps 56 moving the assembly 34 to the desired position along the longitudinal axis of the beam and barrel, and then re-clamping the clamps 56 on the barrel 11, the base 37 being moved with relation to the slots 41 and adjusted accordingly so that the buoyancy lift assembly 34 is maintained extending with axis vertical.

In order to oppose any sudden reaction due to vibration of the instrument or responsive to sudden insignificant changes of density in the circulating fluid flowing through the barrel 11, the mechanical dashpot 27 is provided. The effect of vibration, sudden density changes, and other undesirable factors are also minimized so that they are not adversely reflected in the readings of the manometer and pressure recorder because the compressed air which acts in these instruments is delayed in responding to sudden changes occurring in the system of the device since it has to pass through the chokes 92 and 93 and since it is temporarily reservoired in the volumetric enclosure offered by the conduit 111 and the bonnet housing 112 of the pressure regulator 87.

Another difficult problem is solved by the design of the device in such a manner that the barrel passing the mud to be weighed will not be required to move about its pivot any appreciable amount throughout the range of measurement. This limitation of movement is desirable since even though the couplings 15 are flexible, any appreciable distortion thereof hinders the circulated fluid from exerting a downward force in direct proportion to density.

As the invention is designed, the only movement required of the flow barrel 11 throughout its entire range of operation is that movement necessary to change the escape port 72 by the amount of closure required to restrict the port so that less of the compressed air escapes therethrough with the consequence that the air pressure builds up in the buoyancy tube. Even this small movement can be minimized by automatically increasing the upstream pressure at the input choke 89. This is accomplished by providing an air pressure feed back through the conduit 111 and into an enclosed bonnet housing 112 which constitutes part of the pressure regulator 87. Thus during periods when the circulating fluid is in the higher ranges of density a higher range of air pressure is obtained in the conduit to the buoyancy lift assembly since the compressed air fed back into the bonnet 112 acts therein in a conventional manner to add its pressure to the pressure of the conventional means resisting the diaphragm of the pressure regulator, thereby increasing the upstream fluid pressure which flows from the pressure regulator to the choke 89. Such increased air pressure applied at the choke 89 will result in air passing therethrough at a faster rate and thus the escape port 72 will have to pass more air in order that a balance is maintained between the upwardly acting buoyancy lift and the downwardly acting force of the increased density circulating fluid. For this reason the escape port opening does not have to change appreciably to accommodate the higher ranges of operation.

As safety features to prevent the loss of the mercury the felt closures 46 and 66 are provided, such closures being porous to permit the passage of air therethrough while excluding the mercury. Thus the mercury will be retained in the tube 47 or in the space 67 within the cap 64, as in cases where the device may be turned over or on its side in shipment.

Broadly the invention relates to a means, apparatus, or device operative on the buoyancy bell principle and employable for measuring and recording fluid density and as such the invention is not limited to the particular structures shown in the drawings and disclosed in the specification but various embodiments and modifications are considered as such may fall within the broad spirit of the invention and within the broad scope of interpretation claimed for, and merited by the appended claims.

What is claimed is:

1. An apparatus for measuring and recording density of fluids including a return bend conduit with ends pivotally mounted about a transverse axis in the horizontal plane and flexibly connected to a respective inlet and outlet to said conduit, a beam pivotally mounted about an axis parallel to said first axis, a linkage pivotally connecting one end of said beam to said conduit at the center of said bend while said beam on the opposite side of the beam pivot has a mechanical dashpot on the end thereof to dampen movement and a balancing weight on said beam to cooperate therewith in balancing out the weight of said conduit when filled with fluid flowing therethrough of a predetermined reference minimum density, a buoyancy tube assembly comprising an upwardly discharging gas inlet tube, a buoyancy tube of predetermined constant effective cross-sectional area concentrically surrounding said inlet tube and having opening means in the bottom thereof, a yoke connected across said conduit between its pivot and said linkage means closing the upper end of said buoyancy tube and connecting it upwardly to said yoke, and a fixedly mounted cylindrical mercury tube concentrically surrounding said buoyancy tube and open upwardly to atmospheric pressure and having a closure base from which said inlet tube extends upwardly, said mercury tube containing mercury therein and said mercury extending into said buoyancy tube, an escape valve connected to said beam and moved toward closed position upon downward movement of said conduit responsive to increase of density of fluid flowing therein, a source of compressed gas, a gas line leading from said source and branching to communicate with said inlet tube and with said escape valve, a pressure gauge connected to said gas line to measure the pressure of gas flowing therein and of the gas entering said inlet tube to build up equivalent pressure therein to bear downwardly on the mercury in said buoyancy tube and thereby raise the mercury level in said mercury tube to increase the buoyancy of said buoyancy tube whereby it acts as a restorative means to lift said conduit toward original position of initial equilibrium, said gauge being calibrated to indicate and record the buoyancy tube gas pressure measured in terms of density of the fluid flowing in said conduit.

2. An apparatus for measuring and recording density of fluids including a return bend conduit with ends pivotally mounted about a transverse axis in the horizontal plane and flexibly connected to a respective inlet and outlet to said conduit, a beam pivotally mounted about an axis parallel to said first axis, a linkage pivotally connecting one end of said beam to said conduit at the center of said bend while said beam on the opposite side of the beam pivot has a balancing weight thereon to cooperate therewith in balancing out the weight of said conduit when said conduit is filled with fluid flowing therethrough of a predetermined reference minimum density, a buoyancy tube assembly comprising an upwardly discharging gas inlet tube, a buoyancy tube of predetermined constant effective cross-sectional area concentrically surrounding said inlet tube and having opening means in the bottom thereof, a yoke connected across said conduit between its pivot and said linkage means closing the upper end of said buoyancy tube and connecting it upwardly to said yoke, and a fixedly mounted cylindrical mercury tube concentrically surrounding said buoyancy tube and open upwardly to atmospheric pressure and having a closure base from which said inlet tube extends upwardly, said mercury tube containing mercury therein and said mercury extending into said buoyancy tube, an escape valve connected to said beam and moved toward closed position upon downward movement of said conduit responsive to increase of density of fluid flowing therein, a source of compressed gas, a gas line leading from said source and branching to communicate with said inlet tube and with said escape valve, a pressure gauge means connected to said gas line to measure the pressure of gas flowing therein and of the gas entering said inlet tube to build up equivalent pressure therein to bear downwardly on the mercury in said buoyancy tube and thereby raise the mercury level in said mercury tube to increase the buoyancy of said buoyancy tube whereby it acts as a restorative means to lift said conduit toward original position of initial equilibrium, said gauge means being calibrated to measure the buoyancy tube gas pressure in terms of density of the fluid flowing in said conduit.

3. A device for measuring the density of a pressurized circulating fluid flowing therethrough and comprising a circulating fluid carrying tube adapted to receive said fluid to course therethrough and connected to be pivotally urged downwardly responsive to increase of the density of the circulating fluid above a reference minimum density, a control valve body, a fulcrum, a beam pivoted on said fulcrum and connected at one end to said circulating fluid carrying tube, a balancing weight and a control valve operator carried on the other end of said beam, a tubular buoyancy lift of predetermined constant effective cross-sectional area comprising a buoyancy tube closed upwardly and open downwardly and a surrounding mercury tube concentric with said buoyancy tube and closed downwardly and open upwardly, intercommunicating mercury in the lower part of said buoyancy and mercury tubes, said buoyancy tube being connected to said circulating fluid carrying tube and adapted to urge upwardly thereon responsive to the increase therein of the pressure of a gas, as air, conduit means from a source of compressed air connected to deliver into said buoyancy lift with a branch connected to pass outwardly through said control valve, said control valve being normally open when said reference minimum density circulating fluid flows through said circulating fluid carrying tube, and being closed in degree proportionate to the lifting of said valve operator as said circulating fluid carrying tube is urged downwardly by any increase in weight of the fluid flowing therein whereby the compressed air pressure builds up in said buoyancy lift to cause said buoyancy tube to act as a restorative means and to urge upwardly to balance against the downwardly urging of said circulating fluid carrying tube, said conduit means having gauge means therein and the conduit means fluid pressure acting thereupon and at substantially the pressure of the fluid in the buoyancy lift and said gauge means being calibrated in terms of circulating fluid density above the said reference minimum to be indicated and recorded by said gauge means.

4. A device for measuring the density of fluid flowing in a conduit and comprising a flow barrel flexibly coupled into said conduit and pivotally mounted at a point spaced from the coupling means, a dead weight pivotally mounted and connected to balance the weight of said flow barrel, a liquid sealed, inverted buoyancy bell means of predetermined constant effective cross-sectional area comprising a buoyancy tube closed upwardly and open downwardly and a surrounding mercury tube concentric with said buoyancy tube and closed downwardly and open upwardly, intercommunicating mercury in the lower part of said buoyancy and mercury tubes, said buoyancy tube being connected to said barrel and movable relative to said mercury tube to urge upwardly on said barrel responsive to an increase of gas pressure in said buoyancy tube, a pressurized gas conduit having an inlet therefrom into said buoyancy tube and downstream therefrom including a valve body at an end thereof providing an escape port, a valve member connected to said dead weight and movable therewith to control said escape port and thereby the gas loading and unloading of said buoyancy tube responsive, respectively, to increase or decrease in density of the fluid flowing in the barrel, and indicia graduated to measure the gas pressure operative in said buoyancy tube in terms of density of the fluid flowing in said barrel, said buoyancy tube thereby acting as a restorative means to position said flow barrel toward its position of initial equilibrium.

5. A device for measuring the density of fluid flowing in a conduit including a flow barrel flexibly coupled into, and pivotally mounted with relation to said conduit to exert a torque, a dead weight pivotally mounted and operatively connected to said flow barrel to evxert a counter-torque in degree to balance the torque developed by the weight of the flow barrel and the torque developed by the weight of fluid at predetermined minimum density flowing through said flow barrel, a liquid sealed and gas loaded inverted buoyancy bell means of predetermined constant effective cross-sectional area comprising a buoyancy tube closed upwardly and open downwardly and a surrounding concentric mercury tube closed downwardly and open upwardly, intercommunicating mercury in the lower part of said buoyancy and mercury tubes, said buoyancy tube being connected to said flow barrel and movable relative to said mercury tube to urge upwardly on said flow barrel responsive to an increase of gas pressure in said buoyacny tube, said buoyancy bell means being adapted to automatically control its gas loading in degree of counter-torque in balancing opposition to the torque represented by the increase of weight of fluid flowing through said flow barrel at a density above said minimum density, and means to measure the gas load of said buoyancy tube in terms of increase of said fluid density above said minimum density, said buoyancy tube thereby acting as a restorative means to position said flow barrel toward its position of initial equilibrium.

6. A device for measuring the density of fluid flowing in a conduit including a flow barrel flexibly coupled to, and pivotally mounted with relation to said conduit to exert a torque, a dead weight pivotally mounted and operatively connected to said flow barrel to develop counter-torque to balance torque developed by the weight of the flow barrel, buoyancy bell means of predetermined constant effective cross-sectional area comprising a buoyancy tube closed upwardly and open downwardly and a surrounding concentric mercury tube closed downwardly and open upwardly, intercommunicating mercury in the lower part of said buoyancy and mercury tubes, said buoyancy tube being connected to said flow barrel and movable relative to said mercury tube to urge upwardly on said flow barrel responsive to an increase of gas pressure in said buoyancy tube, means adapted to automatically control the gas loading of said buoyancy tube in degree of counter-torque in balancing opposition to the torque represented by the weight of fluid flowing in the flow barrel at various densities, and means to measure the gas load of said buoyancy hollow member in terms of the density of the fluid flowing in said flow barrel, said buoyancy tube thereby acting as a restorative means to position said flow barrel toward its position of initial equilibrium.

7. An apparatus for measuring the density of a fluid and comprising a flow barrel flexibly coupled into, and pivotally mounted, with relation to a conduit carrying said fluid, to extend generally horizontally and to move downwardly with a torque force upon increase of the density of fluid flowing therein, a beam pivotally mounted and operatively connected to said flow barrel and a dead weight adjustably positionable along said beam to move with said beam in developing a counter-torque in degree to balance the torque developed by the weight of the flow barrel and the weight of fluid at predetermined minimum density flowing through said flow barrel, a liquid sealed and gas loaded buoyancy bell means of predetermined effective cross-sectional area comprising a buoyancy tube closed upwardly and open downwardly and a surrounding concentric mercury tube closed downwardly and open upwardly, intercommunicating mercury in the lower part of said buoyancy and mercury tubes, said buoyancy tube being connected to said flow barrel and movable relative to said mercury tube to urge upwardly on said flow barrel responsive to an increase of gas pressure in said buoyancy tube, means to automatically control the gas pressure effective in said buoyancy tube to develop counter-torque in balancing opposition to the torque represented by the increase of weight of fluid flowing through said flow barrel at a density above said minimum density, and means measuring said gas pressure in said buoyancy tube and adapted to constantly indicate and/or record measurement in terms of the density of the fluid flowing in the flow barrel, said buoyancy tube thereby acting as a restorative means to position said flow barrel toward its position of initial equilibrium.

8. An apparatus as claimed in claim 6 in which said means to control the gas loading includes escape valve means carried by one of said flow barrel and said beam.

9. An apparatus as claimed in claim 6 in which said means to control the gas loading includes escape valve means carried by said beam.

10. An apparatus as claimed in claim 6 in which said means to control the gas loading includes escape valve means carried by said flow barrel.

11. An apparatus as claimed in claim 6 in which a mechanical dash-pot is provided to dampen dead weight movement responsive to vibration and insignificant and sudden changes in fluid density.

12. An apparatus as claimed in claim 6 in which said means to measure the gas loading includes means to increase force of responsivity commensurate with the excess in density of fluid flowing in said flow barrel above said minimum density.

References Cited in the file of this patent

UNITED STATES PATENTS

| | | |
|---|---|---|
| 2,626,626 | Rosenberger et al. | Jan. 27, 1953 |
| 2,669,247 | Olah | Feb. 16, 1954 |

FOREIGN PATENTS

| | | |
|---|---|---|
| 776,926 | Great Britain | June 12, 1957 |